United States Patent [19]

Shafer

[11] 4,272,152
[45] Jun. 9, 1981

[54] UNIT MAGNIFICATION RELAY SYSTEMS

[75] Inventor: David R. Shafer, Fairfield, Conn.

[73] Assignee: The Perkin-Elmer Corporation, Norwalk, Conn.

[21] Appl. No.: 84,745

[22] Filed: Oct. 15, 1979

[51] Int. Cl.³ ............................................. G02B 17/08
[52] U.S. Cl. ........................................ 350/27; 350/45; 350/55
[58] Field of Search ................... 350/27, 55, 199, 200, 350/294, 45

[56] References Cited

U.S. PATENT DOCUMENTS

| | | | |
|---|---|---|---|
| 3,206,603 | 9/1965 | Mauro | 350/294 |
| 3,244,073 | 4/1966 | Bollwers et al. | 350/200 |
| 3,274,886 | 9/1966 | Rosin | 350/27 |
| 3,455,623 | 7/1969 | Harris | 350/27 |
| 3,748,015 | 7/1973 | Offner | 350/55 |

FOREIGN PATENT DOCUMENTS 398908  3/1974  U.S.S.R. ..................................... 350/27

OTHER PUBLICATIONS

Rosin, Seymour, "Inverse Cassegrainian Systems", *Applied Optics*, vol. 7, No. 8, pp. 1483–1497.

*Primary Examiner*—Jon W. Henry
*Attorney, Agent, or Firm*—S. A. Giarratana; E. T. Grimes; T. P. Murphy

[57] ABSTRACT

The radii of two concave and two convex mirrors have the same absolute value. The two concave mirrors are placed back to back and have a central aperture. The two convex mirrors face the concave mirrors and also have a central aperture. An image at the apex of one of the convex mirrors will be imaged at unit magnification at the vertex of the other convex mirror if the spacing between the concave and convex mirrors is 0.866 times the absolute value of their radius. This system is corrected for all aberrations except astigmatism. Astigmatism is corrected by a double convex thin lens at the intermediate image at the vertices of the concave mirrors. Petzval curvature introduced by the field lens may be corrected by plano-concave lenses near the object and image planes. Alternatively identical shell lenses may be placed on either side of the intermediate image to correct for both astigmatism and Petzval curvature. The lenses may be achromatic doublets to correct for chromatic variation of field aberrations. The mirrors may be formed on the outer surfaces of transparent objects for stability and convenience. High indices of refraction of the transparent objects increase the f number speed of the systems.

25 Claims, 2 Drawing Figures

UNIT MAGNIFICATION RELAY SYSTEMS

TECHNICAL FIELD

This application relates to unit magnification relay systems, more particularly it relates to such systems employing pairs of equal radius concave and convex mirrors, separated by a distance equal to 0.866 times the mirror radii. The unit magnification systems may be utilized in printing integrated circuits, or in relaying an image from one place to another for convenience, e.g. the introduction of a chopper or other image modifying device, in periscopes or the like.

The invention provides high performance imaging with only two separate radii, all spherical surfaces and small obscuration. It is superior to complex refractive or catadioptric systems. The systems can be used at fast f numbers and has high transmission. The systems have no third order aberrations, no coma or distortion of any order. By utilizing thin lenses the systems have no axial or lateral color. If the lenses are achromatic doublets, chromatic variation of field aberrations are also eliminated.

BACKGROUND ART

In an article entitled "Inverse Cassegranian Systems" by Seymour Rosin, appearing at page 1483 in Applied Optics, August, 1968, volume 7, number 8, there is described a two mirror system in FIG. 15. This system is described as a spherically corrected inside-out system, no obscuration. The system has a magnification of 3.73205. It comprises a large concave mirror and a small convex mirror both having small apertures in the center. The object is at the apex of the large concave mirror and is imaged at the apex of the small concave mirror. The mirrors have equal radii and are separated by a distance equal to 0.866 times their radii.

Rosin's system can be represented in FIG. 1 by convex mirror 10 and concave mirror 12 having equal radii and separated by 0.866 times that radius. Reversing the object and image planes from that described in Rosin, an image 14 at the vertex of mirror 10 will be imaged at 16 at the vertex of mirror 12. The magnification will be 3.73205. Mirrors 10 and 12 are spherical. When the radii of mirrors 10 and 12 are equal, there is always a mirror separation that will give the imaging relationship just described. Rosin discovered that for this case of equal radii and vertex to vertex imaging the third order spherical aberration is zero. Since the radii are equal and opposite the Petzval curvature is also zero. The system disclosed by Rosin has coma and astigmatism.

DISCLOSURE OF INVENTION

In the system described by Rosin there is always a stop position which eliminates astigmatism. The stop 18 is shown in FIG. 1.

Suppose that an identical system comprising a concave mirror 20 and convex mirror 22 is placed back to back with the first system with the vertices of concave mirrors 12 and 20 coincident at image 16.

Mirrors 20 and 22 will contribute no third order spherical aberration or Petzval curvature. Coma for the entire system will cancel by symmetry. However, the stop position which eliminates astigmatism for the mirrors 10 and 12 will not be imaged by mirrors 20 and 22 to fall in the same place in the second portion of the system. So astigmatism will be corrected in the first half but not in the second half.

According to my invention I have added the field lens 24 at image 16. The sole function of lens 24 is to image the aperature stop 18 at the corresponding location indicated at 26 in the second half of the system.

This corrects the system for astigmatism. The biconvex lens 24 has the same radius on both sides but it is a different radius from the mirrors 10, 12, 20 and 22, which are all equal. Since lens 24 is at image 16 it contributes no third order aberrations, except Petzval curvature or lateral or axial color. It does create Petzval curvature however. Since the pupils are now symmetrical in the system, distortion in the first half is cancelled by the second half. The system has only Petzval curvature due to the lens 24. I therefore add field lenses 28 and 30 near image plane 14 and object plane 32. Lenses 28 and 30 are plano-concave the plane side being towards the respective image and object planes 14 and 32, and have the same radii as lens 24. Thus the invention provides a simple unit magnification relay system with no third order aberration and just two separate radii, not counting the flat sides of the plano-concave field lenses 28 and 30.

OBJECTS OF THE INVENTION

It is therefore an object of the invention to provide unit magnification relay systems.

Another object of the invention is to provide such systems utilizing all spherical surfaces.

A further object of the invention is to provide such systems having small obscuration.

Still another object of the invention is to provide such systems utilizing only two radii.

Yet still another object of the invention is to provide such systems providing fast f numbers.

A further object of the invention is to provide such systems having no third order aberrations, no coma, or distortion of any order.

Another object of the invention is to provide such systems in which chromatic variation of field aberrations is eliminated.

Still another object of the invention is to provide such systems for use at widely differing wave lengths of the electromagnetic spectrum.

A further object of the invention is to provide such systems that are telescentric.

A still further object of the invention is to provide such systems for use in printing integrated circuits.

The invention accordingly comprises the features of construction and elements, arrangements of parts and articles of manufacture possessing the features, properties and the relationship of elements which will be exemplified in the constructions and articles hereinafter described.

The scope of the invention is indicated in the claims.

BRIEF DESCRIPTION OF DRAWINGS

For a fuller understanding of the nature and objects of the invention reference should be had to the following detailed description taken in connection with the accompanying drawing in which.

The same reference characters refer to the same elements throughout the several views of the drawing.

BEST MODE FOR CARRYING OUT THE INVENTION

Figure 1:
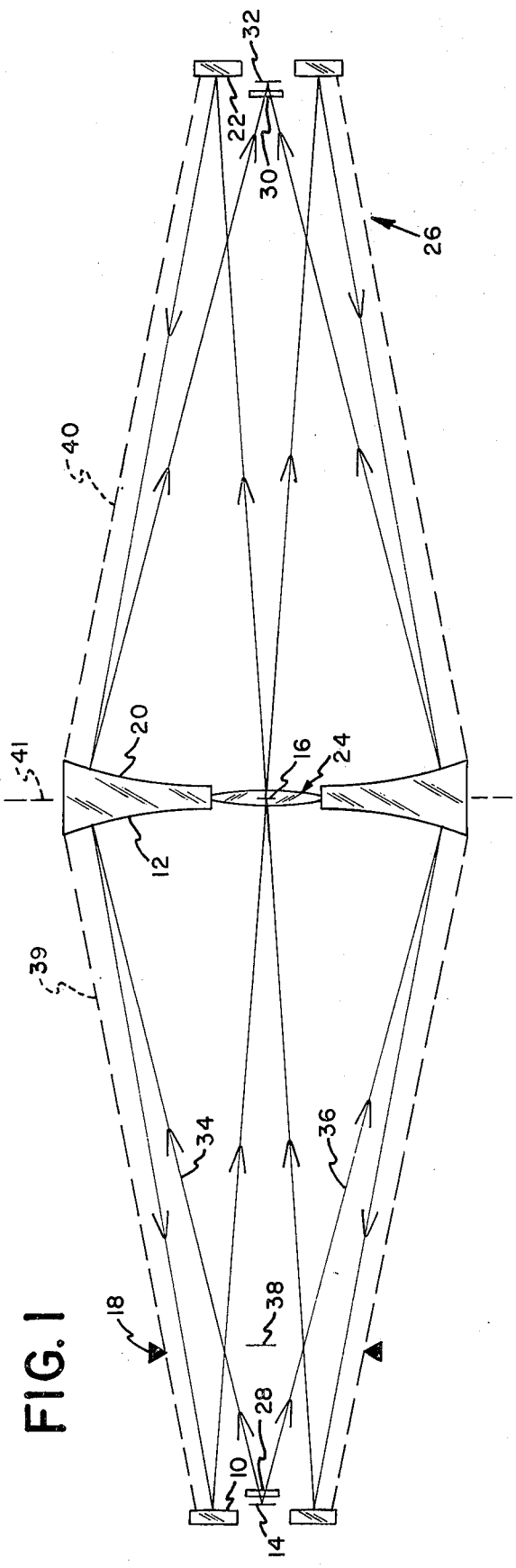
FIG. 1 is a diagramatic view of a unit magnification relay system according to the invention.

FIG. 1 has already been described with reference to the disclosure of the invention. Those skilled in the art will understand that aperture stop 18 is placed in the plane defined by the crossovers of the marginal rays 34 and 36. A small circular baffle 38 is also located in this plane to prevent axial rays from passing directly through the system without encountering the mirrors.

The mirrors 10 and 22 may be mounted on supports as shown and the mirrors 12 and 22 mounted on a common support as also shown in FIG. 1, for systems utilizing air as the transmission medium. Alternatively the mirrors 10 and 12 may be placed on the outside of a solid body indicated at 39 and mirrors 20 and 22 located on the surface of another solid body indicated in dotted lines at 40. Bodies 39 and 40 (divided at 41) might for example be Germanium in an infrared system. Utilization of a transmissive medium of higher index of refraction than air, such as Germanium for an infrared system or glass for a visible light system, increases the f number speed.

An optimized system as shown in FIG. 1 suitable for use in the deep ultraviolet for an object of unit diameter at f/2 and using air as the transmissive medium and fused silica for the lenses 24, 28 and 30 would have the following specifications. The object 14 is located at the vertex of mirror 10. The plane surface of plano-concave lens 28 is based 0.5 units from object 14. The lens 28 is 0.25 units thick; the radius of the curved surface of lens 28 is 30.19250. The distance from the concave surface of lens 28 to mirror 12 is 48.81174 units. The radii of all mirrors are 57.50000 units. The separation of mirrors 10 and 12 and mirrors 20 and 22 is 50.29428 units. The thickness of lens 24 is 0.5 units. The radii of the surfaces of lens 24 are 30.19250 units. The distance from mirror 20 to the concave surface of lens 30 is 48.81174 units. Lens 30 has the same radius as lens 28. The distance from the plano-surface of lens 28 to the image 32 is 0.5000 units. The distance from mirror 10 to the lens 24 is 50.5000.

As previously stated the mirror separation is always 0.866 units times the mirror radii. However, in optimizing the system the mirror separation may vary plus or minus 2%. The focal length of lens 24 is 0.52 times the radii of the mirrors and this also may very plus or minus 2%. The focal length of lenses 28 and 30 is 1.04 times the radii of the mirrors and this also may vary plus or minus 2%.

Figure 2:
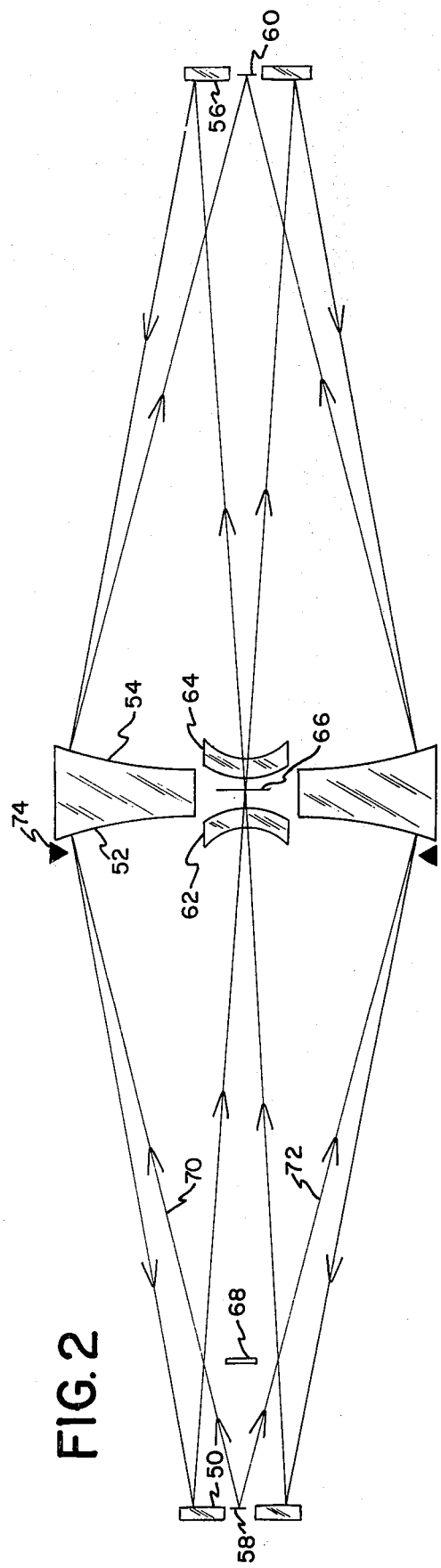
FIG. 2 is a diagram of another unit magnification relay system according to the invention.

Now referring to FIG. 2. Another system according to the invention comprises mirrors 50, 52, 54 and 56 all having the same radii. The mirrors are separated by a spacing 0.866 of this radii to provide a unit magnification system having image plane 58 and object plane 60. Shell lenses 62 and 64 are slightly spaced away from intermediate image plane 66. Baffle 68 is provided at the plane defined by the crossover of marginal rays 70 and 72. Stop 74 is provided as close to mirror 52 as possible for the aperture desired.

The parameters of the system shown in FIG. 2 for an f/2 system, an object of unit diameter, and air as the transmissive medium are as follows: The radius of the mirrors 50, 52, 54 and 56 is 57.5 units. Lenses 62 and 64 are identical and have the same radius on the sides of 4.614 units. The thickness of lenses 62 and 64 is 1.5 units. The separation between the inner surfaces of lenses 62 and 64 is 2 units. The separation between the object 58 and mirror 52 and the image 60 and mirror 54 is 49.743 units. The separations of the mirrors 50 and 52 and mirrors 54 and 56 is 49.80 units. The distance from the vertex of mirror 50 to the first surface of lens 62 is 48.796 units; and this is true of the second surface of lens 64 to image 60. The vertices of mirrors 52 and 54 are separated by 0.99266 units.

The lenses 62 and 64 as are the lenses 28, 24 and 30 of FIG. 1 are of fused silica having an index of refraction of 1.5.

It will be noted that by using shell lenses 62 and 64 astigmatism can be corrected without introducing Petzval curvature so that lenses are not required near the object and image planes 58 and 60. Furthermore, the use of lenses 62 and 64 removes lens surfaces from extremely close spacing to image or object planes, and thus minimizes the effects of surface defects in the lenses.

The systems according to the invention are telecentric and therefore the size of a slightly out of focus image is unchanged. This is highly desirable when the object is a master for an integrated circuit at the image for example.

It will thus be seen that the objects set forth above among those made apparent from the preceding description, are efficiently attained and, since certain changes may be made in the above systems and articles without departing from the scope of the invention it is intended that all matter contained in the above description as shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by letters patent is:

1. A unit magnification relay system comprising:
   (A) a pair of concave mirrors mounted back to back and having at their vertices an aperture; and
   (B) a pair of convex mirrors, one on each side of and facing said concave mirrors;
   the absolute value of the base radius of curvature of all of said mirrors being substantially equal and the vertex of each said concave mirrors being spaced from the vertex of the facing convex mirror by a distance substantially equal to 0.866 times said absolute value.

2. The relay system of claim 1 and:
   (C) a field lens in said aperture.

3. The relay system of claim 2 and:
   (D) a field flattening lens near the vertex of each of said convex mirrors.

4. The relay system of claim 3 wherein said field lens is bi-convex and said field flattening lenses are plano-convex and the curved surfaces of said lenses all have substantially the same radii of curvature.

5. The relay system of claims 2, 3 or 4 wherein the focal length of said field lens is substantially 0.52 times said absolute value.

6. The relay system of claims 3 or 4 wherein the focal lengths of said field flattening lenses are substantially 1.04 times said absolute value.

7. The relay system of claim 6 wherein the focal length of said field lens is substantially 0.52 times said absolute value.

8. The relay system of claim 1 and (C) field lens surfaces near the vertices of said pair of concave mirrors.

9. The relay system of claim 1 and
(C) a pair of substantially identical field lenses, one on each side of the vertices of said concave mirrors.

10. The relay system of claim 9 wherein said field lenses are shells.

11. The relay system of claim 10 wherein the absolute values of the radii of surfaces of said lenses are substantially equal.

12. The relay system of claims 1, 2, 3, 8, 9, 10, or 11 and
(D) a baffle substantially in the plane defined by the cross-overs of marginal rays emanating from the vertex of each said convex and concave mirrors.

13. The relay system of claim 12 wherein said baffle is symmetrical about the line defined by the vertices of said mirrors.

14. The relay system of claims 1, 2, 3, 8, 9, 10, or 11 wherein there is an aperture at the vertices of said convex mirrors.

15. The relay system of claim 14 and
(D) a baffle substantially in the plane defined by the cross-overs of marginal rays emanating from the vertex of each said convex and concave mirrors.

16. The relay system of claims 1, 2, or 3 and:
(E) an aperture stop substantially in the plane defined by the cross-overs of marginal rays emanating from the vertex each said convex and concave mirrors.

17. The relay system of claims 8, 9, 10, or 11 and:
(E) an aperture stop at one of said concave mirrors.

18. The relay system of claims 1, 2, 3 or 8 wherein at least one lens is an achromatic doublet.

19. The relay system of claim 8 wherein the focal length of the field lens is substantially equal to 0.52 times said absolute value.

20. The relay system of claims 2, 3, or 4 wherein said absolute value is substantially 57.5; said mirror separation substantially 50.29482; and the absolute value of the radii of the surfaces of said field lens substantially 30.19250.

21. The relay system of claim 20 wherein the absolute value of the radii of the curved surfaces of said field flatening lenses is substantially 30.1925.

22. The relay system of claims 8, or 9 wherein said absolute value is substantially 57.5; said mirror spacing substantially 49.8; and the absolute value of the radii of said field lens surfaces is substantially 4.614302.

23. The relay system of claim 1 wherein said absolute value is substantially 57.5 and said mirror separation substantially 50.29482.

24. The relay system of claim 1 wherein said absolute value is substantially 57.5 and said mirror spacing substantially 49.8.

25. The relay system of claim 1 wherein said mirrors are formed as the outer surfaces of light transmissive objects.

* * * * *